(12) United States Patent
Uebel et al.

(10) Patent No.: US 10,693,271 B2
(45) Date of Patent: Jun. 23, 2020

(54) BROADBAND LIGHT SOURCE DEVICE AND METHOD OF CREATING BROADBAND LIGHT PULSES

(71) Applicant: Max-Planck-Gesellschaft zur Förderung der Wissenschaften E.V., Munich (DE)

(72) Inventors: Patrick Sebastian Uebel, Marloffstein (DE); Philip St. J. Russell, Röttenbach (DE); Sebastian Thomas Bauerschmidt, Wendelstein (DE)

(73) Assignee: Max-Plank-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 16/471,035

(22) PCT Filed: Jan. 9, 2017

(86) PCT No.: PCT/EP2017/000023
§ 371 (c)(1),
(2) Date: Jun. 19, 2019

(87) PCT Pub. No.: WO2018/127266
PCT Pub. Date: Jul. 12, 2018

(65) Prior Publication Data
US 2019/0319420 A1 Oct. 17, 2019

(51) Int. Cl.
*H01S 3/00* (2006.01)
*G02F 1/35* (2006.01)
(Continued)

(52) U.S. Cl.
CPC .......... *H01S 3/0092* (2013.01); *G02F 1/3501* (2013.01); *G02F 1/353* (2013.01); *G02F 1/355* (2013.01); *G02F 1/365* (2013.01)

(58) Field of Classification Search
None
See application file for complete search history.

(56) References Cited

U.S. PATENT DOCUMENTS 7,519,253 B2 * 4/2009 Islam ...................... G02F 1/365
385/122
7,746,545 B2 * 6/2010 Okuno ................ H01S 3/06795
359/326

(Continued)

FOREIGN PATENT DOCUMENTS

EP  3 136 143 A1  3/2017
GB  2526879 A   12/2015

OTHER PUBLICATIONS

Hayes et al., "Antiresonant Hollow Core Fiber with Octave Spanning Bandwidth for Short Haul Data Communications," Optical Society of America, Optical Fiber Communication Conference, 2016; 3 pages.

(Continued)

*Primary Examiner* — Rhonda S Peace
(74) *Attorney, Agent, or Firm* — Sterne, Kessler, Goldstein & Fox P.L.L.C.

(57) ABSTRACT

A broadband light source device (100) for creating broadband light pulses (1) comprises a hollow-core fiber (10) of non-bandgap type including a filling gas and being arranged for creating the broadband light pulses (1) by an optical nonlinear broadening of pump laser pulses (2), wherein the hollow-core fiber (10) has an axial hollow light guiding fiber core (11), which supports core modes of a guided light field, and an inner fiber structure (12), which surrounds the fiber core (11) and which supports transverse wall modes of the guided light field, and a pump laser source device (20) being arranged for creating and providing the pump laser pulses (2) at an input side (13) of the hollow-core fiber (10), wherein the transverse wall modes include a fundamental (Continued)

transverse wall mode and second and higher order transverse wall modes, the broadband light pulses (1) have a core mode spectrum being determined by a fiber length, a fiber core diameter, at least one pump pulse and/or beam parameter of the pump laser pulses (2) and at least one gas parameter of the filling gas, and the inner fiber structure (12) of the hollow-core fiber (10) is configured such that at least the second and higher order transverse wall modes and the core mode spectrum have a spectral displacement relative to each other. Furthermore, a method of creating broadband light pulses is described.

21 Claims, 4 Drawing Sheets

(51) Int. Cl.
*G02F 1/355* (2006.01)
*G02F 1/365* (2006.01)

(56) References Cited

U.S. PATENT DOCUMENTS

| | | | |
|---|---|---|---|
| 8,554,037 B2 | 10/2013 | Peng et al. | |
| 8,731,009 B2* | 5/2014 | Buchter | G02F 1/365 |
| | | | 372/6 |
| 9,160,137 B1 | 10/2015 | Abdolvand et al. | |
| 9,785,033 B2* | 10/2017 | Gattass | G02F 1/353 |
| 9,904,008 B2* | 2/2018 | Fokoua | G02B 6/02328 |
| 2006/0002437 A1* | 1/2006 | Braun | G02F 1/365 |
| | | | 372/22 |
| 2012/0082410 A1 | 4/2012 | Peng et al. | |
| 2019/0319420 A1* | 10/2019 | Uebel | G02F 1/355 |

OTHER PUBLICATIONS

International Search Report and Written Opinion of the International Searching Authority directed to related International Patent Application No. PCT/EP2017/000023, dated Oct. 11, 2017; 14 pages.

International Preliminary Report on Patentability directed to related International Patent Application No. PCT/EP2017/000023, dated Jul. 9, 2019; 11 pages.

Tani et al., "PHz-wide Supercontinua of Nondispersing Subcycle Pulses Generated by Extreme Modulational Instability," Physical Review Letters, vol. 111, No. 033902, 2013; pp. 1-5.

Belli et al., "Vacuum-ultraviolet to infrared supercontinuum in hydrogen-filled photonic crystal fiber," Optica, vol. 2, No. 4, Apr. 2015; pp. 292-300.

Gerbert et al., "Damage-free single-mode transmission of deep-UV light in hollow-core PCF," Optics Express, vol. 22, No. 13, Jun. 30, 2014; pp. 15388-15396.

Travers et al., "Ultrafast nonlinear optics in gas-filled hollow-core photonic crystal fibers [Invited]," Journal of the Optical Society of America B, vol. 28, No. 12, Dec. 2011; pp. A11-A26.

Litchinitser et al., "Antiresonant reflecting photonic crystal optical waveguides," Optics Letters, vol. 27, No. 18, Sep. 15, 2002; pp. 1592-1594.

Russell et al., "Hollow-core photonic crystal fibres for gas-based nonlinear optics," Nature Photonics, vol. 8, Apr. 2014; pp. 278-286.

Uebel et al., "Broadband robustly single-mode hollow-core PCF by resonant filtering of higher-order modes," Optics Letters, vol. 41, No. 9, May 1, 2016; pp. 1961-1964.

\* cited by examiner

BROADBAND LIGHT SOURCE DEVICE AND METHOD OF CREATING BROADBAND LIGHT PULSES

The present invention relates to a broadband light source device for creating broadband light pulses, in particular to a broadband light source device including a gas-filled hollow-core photonic crystal fiber of non-bandgap type (HC-ARF) pumped by ultrashort laser pulses. Furthermore, the invention relates to a method of creating broadband light pulses, in particular by coupling ultrashort pump laser pulses into a HC-ARF and creating the broadband light pulses by an optical non-linear broadening of the pump laser pulses in the fiber. Furthermore, the invention relates to a hollow-core photonic crystal fiber, which is configured for creating broadband light pulses by an optical non-linear broadening of ultrashort pump laser pulses in a filling gas within the fiber. Applications of the invention are available in particular in ultraviolet (UV) light based metrology, e. g. semiconductor metrology, and inspection.

In the present specification, reference is made to the following prior art illustrating the technical background of the invention:

[1] P. St. J. Russell et al. in "Nature Photonics" 8, 278-286 (2014);
[2] U.S. Pat. No. 9,160,137 B1;
[3] F. Tani et al. in "PRL" 111, 033902 (2013);
[4] F. Belli et al. in "Optica" 2, 292-300 (2015);
[5] N. M. Litchinitser et al. in "Opt. Lett." 27, 1592-1594 (2002);
[6] F. Gebert et al. in "Opt. Exp." 22, 15388-15396 (2014);
[7] P. Uebel et al. in "Opt. Lett." 41, 1961-1964 (2016); and
[8] J. C. Travers et al. in "J. Opt. Am." B 28 (2011), A11-A26.

It is generally known that optical semiconductor metrology or material inspection systems rely on bright light sources, typically emitting broadband radiation from the vacuum or deep ultraviolet (UV) to the near infrared (IR). Light source architectures are often based on the gas-discharge effect, i.e. by generating an electric discharge in an ionized gas (plasma). A disadvantage of these sources can be their intrinsic spatial incoherence, resulting from a very high number of optical modes within the volume of the discharge arc. For a metrology application a well-defined illumination path is required which requires relatively complex optics that makes access of the sample difficult. In addition, focusing to a diffraction-limited spot requires spatial filtering, resulting in loss of most of the spectral power.

As an alternative, multiple lasers at different wavelengths or white light laser sources have been suggested. In the latter case, broadband pulsed radiation within a range spanned from deep UV to near IR is generated by optically pumping a filling gas within a hollow-core optical fiber. The spectral conversion from ultrashort pump laser pulses to the broadband fiber output is the result of non-linear processes, in particular modulational instability, soliton fission and dispersive wave generation (see [1], [2], [3] and [4]).

Hollow-core optical fibers are typically divided into two classes depending on the physical guidance mechanism: hollow-core photonic bandgap fibers (HC-PBFs) and hollow-core anti-resonant-reflecting fibers (HC-ARFs, fibers of non-bandgap type). White light laser sources require the use of HC-ARFs, which have a sufficient broadband transmission window for guiding the broadband pulsed radiation.

Figure 6:
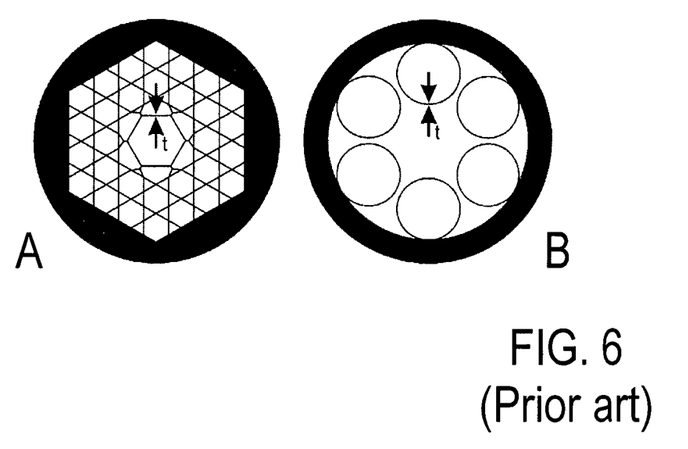
FIGS. 6 and 7: schematic illustrations of conventional HC-ARF's and transmission spectra thereof (prior art).
Figure 7:
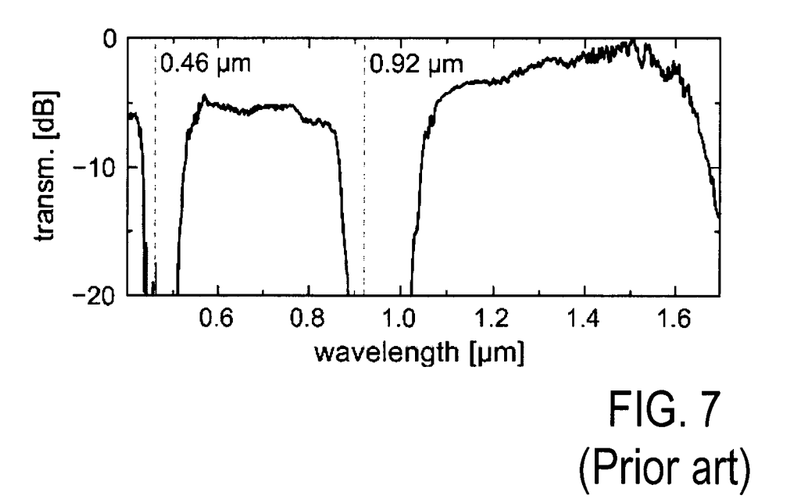

The light guiding mechanism in HC-ARFs, in particular HC-ARFs of Kagome or single ring type, as illustrated in FIGS. 6 and 7 (prior art, not considering the generation of new frequencies), is mostly based on anti-resonant reflection of light from the walls surrounding the hollow-central core (see e.g. [5]). This two dimensional confinement leads to the formation of transverse core modes and the anti-resonance allows for relatively broadband guiding windows.

FIG. 6A shows a cross-sectional view of the HC-ARF of Kagome type as described in [6], wherein guiding of the core modes and the creation of wall modes of light guided within the walls have been investigated for a range of core wall thicknesses from about 190 nm to 295 nm. As an alternative, the HC-ARF of single ring type, as shown in FIG. 6B, has been described in [7], wherein the effects of the single ring diameter, the inner core diameter and the wall thickness t on the fiber transmission have been investigated.

Figure 3:
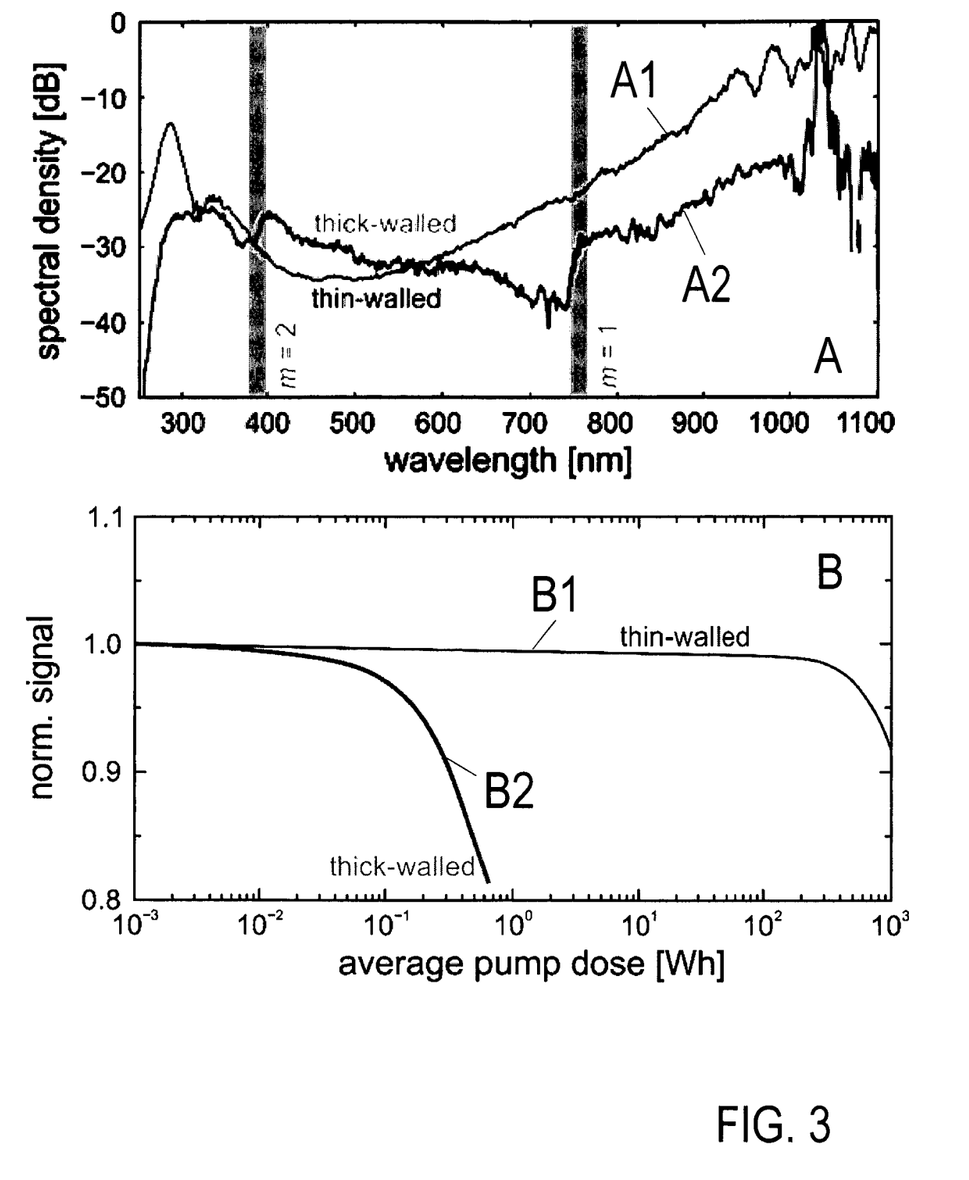

A disadvantage of the mentioned HC-ARFs results can be seen in the effect of resonances of the core modes and the wall modes on the transmission of the HC-ARF, as illustrated in exemplary manner in FIGS. 7 and 3A (curve A2). The transmission through a piece of e. g. 60 cm single ring fiber with a wall thickness t=0.44 µm shows first (m=1, at 0.92 µm) and second (m=2 at 0.46 µm) core wall resonances, that are visible in the fibre transmission spectrum as transmission dips.

As a further disadvantage, it has been found in [6], where the transmission of narrow-band UV light (single-wavelength at e. g. 280 nm) through the HC-ARF has been investigated, that a transmission degradation may occur just after a few hours of operation (similar as shown in FIG. 3B (curve B2)). In [6], it has been suggested that the transmission loss may result from fabrication-induced variations in the thickness of the walls surrounding the core. Furthermore, it has been suggested that the transmission degradation of continuous wave light fields can be suppressed if certain wall thicknesses in the range from about 190 nm to about 290 nm are provided and thickness variations are avoided.

Furthermore, transmission degradations have been identified in [6] as the result of core-wall-resonances, wherein the wavelengths where the core mode phase-matches to wall modes can be approximated by $$kh_{cw}\sqrt{n_g^2(\lambda)-n_m^2}=q\pi, q=1,2,3\ldots$$

wherein $n_m$ is the mode index (refractive index of the filling gas, about 1), $n_g$ is the refractive index of the fiber material, $h_{cw}$ is the thickness of the single rings and the positive integer q defines the transverse resonance order supported by the fiber walls. It has been found in [6] that by selecting the narrowband wavelength of the guided light, a transmission degradation can be avoided.

With the application of HC-ARFs for white light generation, e. g. according to [1] or [8], and an appropriate adjustment of pump pulse and beam parameters, fiber structure, filling gas type and pressure, a broadband output pulse signal in particular in the UV range (wavelength typically below 350 nm) can be generated and guided to the fiber end. However, due to the above transmission degradation in HC-ARFs, the application of the fibers for UV generation can be limited.

The objective of the invention is to provide an improved broadband light source device and an improved method of creating broadband light pulses, being capable of avoiding or reducing disadvantages of conventional techniques. In particular, the broadband light is to be created with improved efficiency, reduced transmission loss in the fiber and/or increased long term stability of operation.

These objectives are solved with a broadband light source device, a method of creating broadband light pulses or a hollow-core fiber, comprising the features of the independent claims, respectively. Preferred embodiments and applications of the invention are defined in the dependent claims.

According to a first general aspect of the invention, the above objective is solved by a broadband light source device for creating broadband light pulses, comprising a hollow-core fiber of non-bandgap type (hollow-core anti-resonant-reflecting fiber) and a pump laser source device.

The hollow-core fiber is any type of non-bandgap hollow light guiding fiber (HC-ARF) being adapted for accommodating a filling gas and for creating the broadband light pulses by an optical non-linear broadening of pump laser pulses. The hollow-core fiber has an axial hollow light guiding fiber core including the filling gas, e. g. a noble gas, like Ar, Ne, He, Kr, Xe, a Raman-active gas like $H_2$, $D_2$, $N_2$ or a gas mixture, and an inner fiber structure. The hollow light guiding fiber core supports core modes of a guided light field. The inner fiber structure has inner walls extending and surrounding the fiber core along the longitudinal extension of the hollow-core fiber, and it supports transverse wall modes of the guided light field. The transverse wall modes include a fundamental transverse wall mode and second and higher order transverse wall modes. The pump laser source device is arranged for creating and providing a periodic sequence of ultrashort pump laser pulses (pump laser pulses having a duration below 1 ps) at an input side of the hollow-core fiber.

Preferably, the pump laser source device is adapted for providing sub-ps pulses with a high repetition rate, e. g. above 100 Hz. The repetition rate of the pump laser source device depends on the choice of the pump source. For example, Ti:Sapphire based pump sources typically operate at 1 kHz, while fiber based pump sources can operate from single shot to tens of MHz.

The sequence of light pulses created in the fiber have a core mode spectrum being determined by a fiber length, a fiber core diameter, at least one pump pulse parameter and/or beam parameter of the pump laser pulses and at least one gas parameter of the filling gas. In particular the spectral range covered by the core mode spectrum is determined the fiber length and the fiber core diameter. Pump pulse parameters comprise e. g. at least one of pulse duration, pulse energy, pulse shape and pulse spectrum. Beam parameters e. g. at least one of modal shape, pointing and stability of the laser beam (light field) provided by the sequence of pump laser pulses.

According to the invention, the inner fiber structure of the hollow-core fiber is configured such that at least the second and higher order transverse wall modes of the transverse wall modes and the core mode spectrum have a spectral displacement relative to each other. In other words, by designing the inner fiber structure of the hollow-core fiber at least the second and higher order resonance positions are spectrally displaced to the generated light confined in the core modes. Accordingly, there is a spectral gap between at least the second and higher order transverse wall modes and the spectral range covered by the core mode spectrum. The transverse wall modes do not overlap with the spectral distribution of the core modes.

According to a second general aspect of the invention, the above objective is solved by a method of creating broadband light pulses, wherein pump laser pulses are directed into a hollow-core fiber of non-bandgap type including a filling gas and the broadband light pulses are created by an optical non-linear broadening of the pump laser pulses in the hollow-core fiber. The hollow-core fiber supports transverse wall modes and a core mode spectrum, which is determined by a fiber length, a fiber core diameter, at least one pump pulse parameter and/or beam parameter of the pump laser pulses and at least one gas parameter of the filling gas.

According to the invention, at least second and higher order transverse wall modes of the hollow-core fiber are spectrally displaced relative to the core mode spectrum of the hollow-core fiber. Accordingly, a HC-ARF is used, which is designed for providing the spectral displacement of the wall modes relative to the core mode spectrum. Preferably, the broadband light laser pulses are created with the broadband light source device according to the first general aspect of the invention.

Advantageously, the inventive broadband light source device and method are capable of synthesizing broadband, high brightness radiation. In particular, the emitted fiber output (broadband light pulses, also designated as UV-IR pulses) has a spectrum covering at least part of the UV wavelength range. Preferably, the emitted spectrum is included in a range from the deep-ultraviolet (UV), e. g. 250 nm to the near-infrared (IR), e. g. 1100 nm. The emitted spectrum is free of spectral features determined by resonances of core modes with wall modes. Furthermore, the term "broadband light source device" refers to a system being adapted for creating a pulsed output included in this emitted spectrum. The broadband light source device can be configured as a table-top device, and it can be used as a tool e. g. for applications in optical metrology (in particular in semiconductor applications), spectroscopy or life sciences. The invention provides a broadband light creation performance, which might be compared to conventional silica-core, fiber-based supercontinuum systems but extends the emitted spectrum to the deep UV. Compared to conventional broadband lamps, the emitted beam is spatially coherent resulting in a dramatically increased spectral brightness and the fiber output results in superb beam pointing stability.

In particular, the invention is based on the following considerations by the inventors. Firstly, at the resonance positions, where the core modes and the wall modes have equal or similar propagation parameters within the fiber, the UV radiation is strongly leaking out of the fiber core and experiences strong attenuation before reaching the fiber end. As a consequence, for providing a strong UV signal to the end user, the resonances and an increase of the transverse field distribution compared to the relatively confined core modes are to be avoided. Secondly, if UV portions of the broadband light strongly overlaps with the inner walls which are part of the inner fibre structure and typically made from silica, gradual fiber degradation is likely to occur (attributed to solarisation). This can be avoided by a suppression of leaking light into the walls.

Accordingly, as an essential advantage, with the inventive separation of the core modes and at least the second and higher order transverse wall modes, resonant coupling of light from the core modes to the transverse wall modes is suppressed, resulting in an increased confinement of the core modes, an overall flatter generated spectrum and a longer lifetime.

Furthermore, the leakage of light field power to the inner structure of the fiber is reduced. The inventors have found that changes in the fiber wall material, in particular the formation of light absorbing sections, can be minimized by reducing the power load to the fiber, so that an increased long term stability of operation can be obtained.

Accordingly, compared to existing HC-ARF based schemes for broadband light generation in the ultraviolet spectral range, the invention increases the lifetime allowing long term and stable generation of light in the ultraviolet spectral region with strongly reduced fiber degradation. In addition, the resonance reduced nature of the fibers in the range of the generated spectrum increases the spectral flatness of the emitted broadband signal and the same time results in a uniform transverse mode profile.

The above advantage can be obtained with the inventive decoupling of the core modes and the second and higher order transverse wall modes already. This results from the following theoretical considerations by the inventors. The fundamental resonance occurs at longer wavelengths than the higher-order resonances. As a consequence, solarisation is less likely to occur, because multi-photon-absorption is needed. Furthermore, the overlap integral between the core mode and the fundamental wall modes is different compared to higher-order resonances. As a consequence, less energy may be transferred from the core mode to the wall modes. Finally, the spectral bandwidth in which energy transfer occurs is different and dependent on the slope difference of the effective index of the wall modes with respect to the core modes. For the fundamental resonance, the slope difference is shallower resulting potentially in a larger spectral bandwidth.

However, if according to a preferred embodiment of the invention, all transverse wall modes, i. e. the fundamental, second and higher order transverse wall modes, and the core mode spectrum have a spectral displacement relative to each other, the complete suppression of resonant coupling of core and wall modes is obtained. Advantageously, the fiber structure is designed such that the first core wall resonance lies below the shortest wavelength of the generated spectrum. The fiber structure used according to the invention minimizes the modal overlap with the wall material, e. g. glass, in the UV, consequently prevents damage of the fiber and thus further increases the lifetime of the system.

According to a further preferred embodiment of the invention, designing the inner fiber structure of the hollow-core fiber, in particular HC-ARF, for decoupling of the core and wall modes is obtained by selecting a wall thickness of the fiber walls of the inner fiber structure facing to the fiber core. The wall thickness is selected at least along a downstream portion of the fiber to be below a limit wall thickness such that at least the second and higher order, preferably all transverse wall modes are spectrally shifted to shorter wavelengths relative to the core mode spectrum. Advantageously, the wall thickness is a fiber parameter which can be easily adjusted when manufacturing the hollow fiber or after manufacturing thereof (e. g. by etching). As a surprising result, the inventors have found that hollow fibers can be provided with sufficiently thin wall thickness of inner structures adjacent to the hollow core without impairing the fiber stability or sensitivity to the light field power guided in the fiber.

As an example, practical tests by the inventors have shown, that reducing the wall thickness from e. g. 0.32 µm (conventional hollow fiber) to about 120 nm, the number of resonances in the transmission spectrum (representing the coupling of core and wall modes) can be reduced from three to one at about 0.25 µm. Even with this remaining resonance in the long wavelength section of the broadband spectrum, a substantial increase of the fiber operation duration could be obtained.

The hollow fiber can have a distribution of wall thicknesses along its length, changing from a larger thickness at the input side to a thickness below the thickness limit wall thickness towards the output side. If the fiber walls of the inner fiber structure have the selected wall thickness below the limit wall thickness exclusively in a longitudinal section of the hollow-core fiber where the broadband light pulses are created and transmitted through the hollow-core fiber towards the output end thereof, further advantages in terms of fiber stability in an upstream portion of the fiber are obtained. Furthermore, it can be beneficial if the fiber has relatively thick walls at the input side to reduce confinement loss of the pump.

The invention can be implemented with any type of the mentioned non-bandgap photonic fibers, including the hollow core and a regular arrangement of inner structures adjacent to the hollow core. Preferably, the inner fiber structure comprises a single ring or a Kagome structure, which have been subjected to extended investigations of their light guiding properties. With the single ring or Kagome type HC-ARF, the fiber walls facing to the fiber core preferably have a wall thickness (t) being selected such that $$t < \frac{\lambda_{min}}{2\sqrt{n_2^2 - n_1^2}} \tag{1}$$

wherein $\lambda_{min}$ is a shortest wavelength of the core mode spectrum, $n_1$ is a refractive index of the filling gas in the hollow-core fiber and $n_2$ is a refractive index of the inner fiber structure. Advantageously, the above formula provides a limit wall thickness, which can be set in dependency on a few known parameters only.

Particularly preferred, the wall thickness is selected in a range from 70 nm to 300 nm, in particular from 70 nm to 150 nm, e. g. with a hollow fiber made of glass (silica). The lower limit has been found to provide sufficient mechanical stability to the hollow fiber and the inner structure thereof. The upper limit advantageously provides suppressing resonances of the core and wall modes. With the upper limit 150 nm, the spectral separation from all wall modes is obtained. Furthermore, the hollow fiber preferably is adapted for supporting a core mode spectrum having the shortest wavelength $\lambda_{min}$ in a range from 170 nm to 250 nm.

According to a further preferred embodiment of the invention, the broadband light source device further includes an adjustment device, which is adapted for adjusting at least one of the at least one pump pulse and/or beam parameter. In a system for practical routine use, the pump laser source device might be preconfigured such that the correct pulse parameter is set. In this case, only control of the beam parameter is provided. Advantageously, the adjustment device is capable of changing e. g. the beam pointing of the pump pulses injected to the hollow fiber, i. e. the beam center relative to the fiber center. Particularly preferred, the adjustment device further includes a section being adapted for adjusting the at least one gas parameter of the filling gas supplied from an optional gas supply device to the hollow fiber, like the gas pressure and/or the gas type.

According to another preferred embodiment of the invention, the broadband light source device further includes a monitoring device being arranged for monitoring at least a part of the core mode spectrum of the broadband light pulses output from the hollow core fiber. Advantageously, the monitoring step allows an on-line measuring and testing the created broadband light pulses. Particularly preferred a control loop is provided including the monitoring device and the adjustment device. The control loop is adapted for controlling the adjustment device such that the spectral displacement of the transverse wall modes and the core mode spectrum is kept during creating the broadband light pulses.

According to a third general aspect of the invention, the above objective is solved by a hollow-core fiber, in particular a HC-ARF, which is adapted for creating broadband light pulses by an optical non-linear broadening of pump laser pulses in a filling gas. The hollow-core fiber has an axial hollow fiber core, which is filled with the filling gas and which supports core modes of a guided light field of the broadband light pulses, and an inner fiber structure, which surrounds the fiber core and which supports transverse wall modes of the guided light field. The transverse wall modes include a fundamental transverse wall mode and second and higher order transverse wall modes. The broadband light pulses have a core mode spectrum being determined by at least one pump pulse parameter of the pump laser pulses and at least one gas parameter of the filling gas. According to the invention, the inner fiber structure of the hollow-core fiber is configured such that at least the second and higher order transverse wall modes and the core mode spectrum have a spectral displacement relative to each other. Using the hollow-core fiber for creating broadband light pulses represents a further independent subject of the invention.

Further details and advantages of the invention are described in the following with reference to the attached drawings, which show in.

Features of the invention are described in the following with particular reference to the broadband light pulse generation in an UV light source device including an HC-ARF of Kagome or single ring type and a control loop for adjusting in particular a pump source device and a gas supply device. The invention is not restricted to these embodiments but rather can be implemented with other types of HC-ARFs and/or without the automatic loop control. Details of the optically non-linear processes for spectrally broadening the pump pulses in the hollow fiber are not described as these are known as such from prior art.

Figure 1:
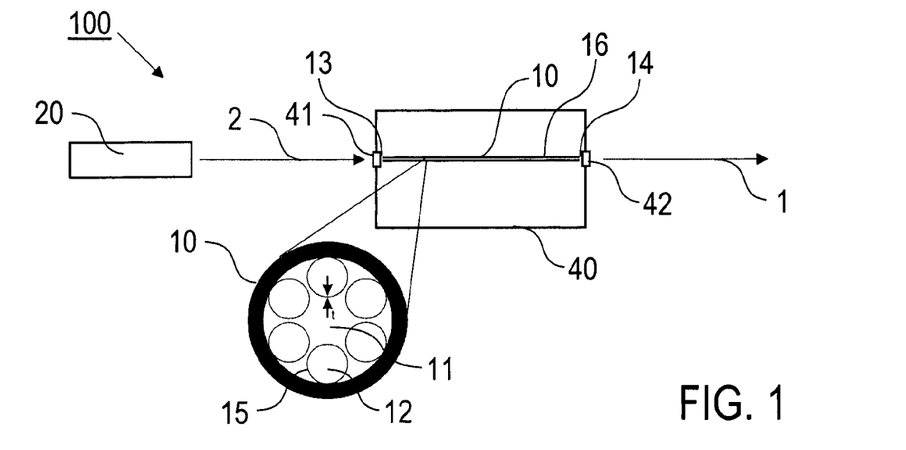
FIG. 1: a schematic view of an embodiment of a broadband light source device according to the invention.

FIG. 1 shows a schematic sketch of the inventive setup for broadband UV-light generation. The broadband light source device 100 comprises a hollow-core fiber 10 and a pump laser source device 20. The hollow-core fiber 10 is e. g. an HC-ARF of single ring type, as shown with the enlarged cross-sectional illustration and in FIG. 2, having a hollow core 11 and an inner fiber structure 12 and extending along a straight longitudinal direction from an input side 13 to an output side 14 of the hollow-core fiber 10. According to the cross-sectional illustration, the inner fiber structure 12 comprises a regular arrangement of e. g. six thin-walled capillaries each with a wall 15 extending with tube shape between the input and output sides 13, 14. The hollow-core fiber 10 has a length of e. g. 50 cm and a core diameter of e.g. 25 μm. The wall 15 has a thickness t of e. g. 300 nm.

The pump laser source device 20 comprises e. g. a pulse source of the type solid state or fiber laser emitting a sequence of pump pulses 2 with a duration in a range from 5 fs to 1 ps, a center wavelength in a range from 200 to 2000 nm and a repetition rate in a range from 0.001 kHz to 100 MHz.

The hollow-core fiber 10 is fixedly arranged in a gas supply device 40, which comprises a gas cell accommodating a filling gas, like e. g. Ar. The gas cell can be connected via a controllable valve with a gas source (not shown), and it has input and output windows 41, 42 transmitting the pump pulses 2 and the broadband light pulses 1, resp. The input and output windows 41, 42 are made of glass with optical quality. In a practical system for commercial use, the external gas source might not be needed. For example, the gas cell can be filled with the filling gas during production and sealed.

For creating the broadband light pulses 1, the beam of the pump laser pulses 2 is directed via the input window 41 onto the input side of the hollow fiber 10 and coupled into the hollow fiber core 11 thereof. The pump laser pulses 2 are injected along a beam path being coincident with the longitudinal axis of the hollow fiber 10. The hollow fiber 10 supports core modes of the guided light field as illustrated in exemplary manner below with reference to FIG. 5. Furthermore, the inner fiber structure 12 supports transverse wall modes of the guided light field. Within the hollow fiber the broadband light pulses 1 are created by an optical non-linear broadening of the pump laser pulses 2, e. g. around the position 16. The broadband light pulses 1 have a broadband core mode spectrum which depends on pump pulse and pump beam parameters, the type of the filling gas and the density (pressure) thereof. The core mode spectrum is set and the hollow fiber is configured such that the transverse wall modes and the core mode spectrum are spectrally displaced relative to each other.

According to the invention, the fiber structure is selected so that the fiber wall thickness t is given by the above equation (1). The minimum wavelength generated is an interplay between fiber structure and length, pump pulse and pump beam parameters and gas type and pressure (influencing the refractive index of the filling gas).

Figure 2:
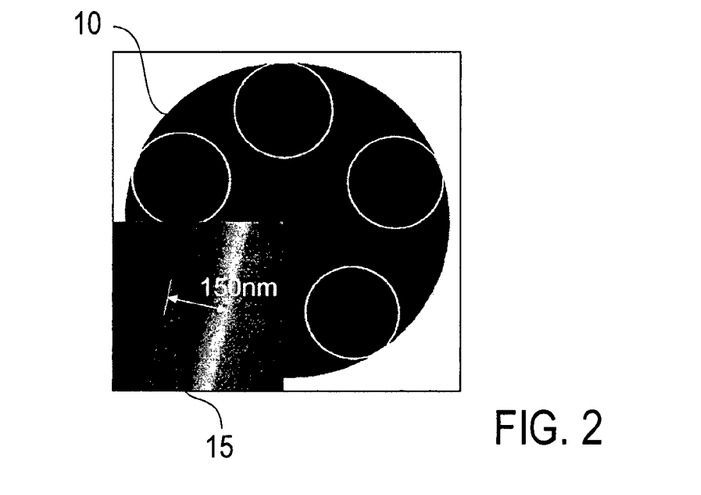
FIGS. 2 and 3: schematic illustrations of the inventive design of a HC-ARF.

FIG. 2 shows another example of a hollow fiber 10, illustrated with a scanning electron microscope image. The single-ring hollow fiber 10 has 150 nm (thin-walled) walls obtained from a conventional hollow fiber with 360 nm walls by HF etching. The inset shows a close-up of the wall 15.

By filling the hollow fiber 10 with a gas, like e. g. Ar, and adjusting the pump parameters, the pump pulses are subjected to spectral broadening and the measured spectrum of broadband light pulses is shown in FIG. 3A (curve A1). The measured spectrum (curved A1) does not show resonance dips in contrast to the output spectrum of a conventional thick-walled fiber (curve A2), which clearly shows two pronounced dips in the signal (m=1 around 760 nm and m=2 around 390 nm).

When the system is operated with a conventional fiber over several hours, clearly a decay of the output power is visible (curve B2 in FIG. 3B). The signal drops by about 20% in 0.6 Wh. If the fiber has thin walls according to the invention the lifetime test (curve B1 in FIG. 3B) shows that the degradation has been improved by a factor of more than 300×.

Figure 4:
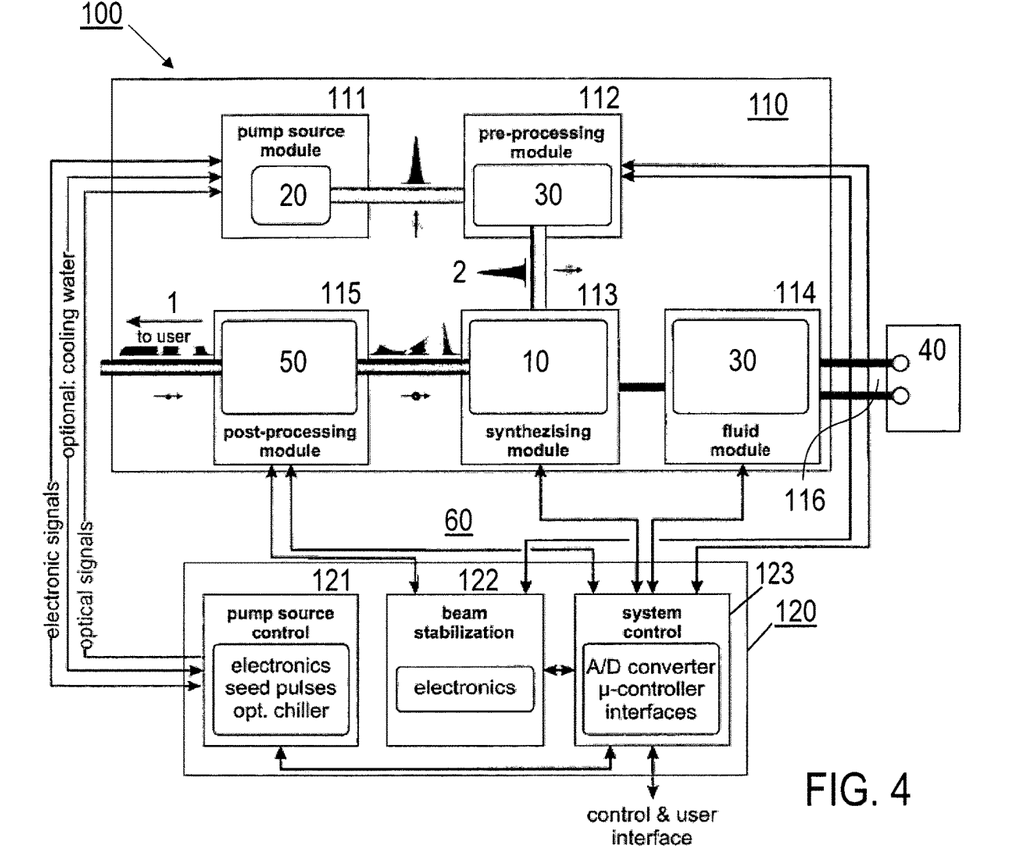
FIG. 4: a schematic view with further details of an embodiment of a broadband light source device according to the invention.

FIG. 4 shows a block diagram with further details of the broadband light source device 100, which can be divided into an optical head 110, in which the broadband light pulses are synthesized and provided to the user, and a control unit 120 that contains electronics, control of the pump source 20 and interfaces.

The optical head 110 includes discrete modules 111 to 115 for pump source 20, pre-processing, synthesizing and post-processing. All modules 111 to 115 are integrated into a single enclosure on a mutual, robust base plate to optimize stability. In a laboratory environment, the optical head 110 is typically placed on an optical table and the broadband light pulses 1 are emitted from the post-processing module 115.

The pump source module 111 contains the pump source device 20 that emits sub-ps pulses with some tens µJ energies at a repetition rate between several 0.001 kHz to a few 10 MHz (adjustable by an electronically-controlled modulator), resulting in up to a few 10 W of average power. The pump source device 20 is typically a fiber or thin-disk laser operating at a central wavelength in the near-IR or the corresponding harmonics (e.g. in the green or UV).

In the pre-processing module 112, pump pulse and pump beam parameters are monitored by optoelectronic means (input check). Additionally, the module 112 includes an adjustment device 30, which shapes relevant properties like beam stability, pulse energy, average power, polarization or beam diameter (beam control). Optionally, an electronically-controlled shutter is inserted to prevent the pump pulses from being delivered to the synthesizing module 113.

The synthesizing module 113 contains optical elements, including mirrors, lenses and/or polarization optics to couple the pump pulses 2—engineered by the pre-processing module 112—into the core of a hollow-core optical fiber (HC-ARF) 10. The optical elements for incoupling are mounted in selected holders and mechanics to optimize stability and coupling efficiency. The hollow fiber 10 is incorporated into one or more gas cells (se FIG. 1) that are connected to the optionally provided fluid module 114. The gas cells are designed so that the hollow fiber 10 can be filled by a fluid (usually a noble gas like Ar, Ne, He, Kr, Xe, a Raman-active gas like $H_2$ or a gas mixture). Using several gas cells (e. g. at the in- and out-coupling sides of the hollow fiber 10) result either in a constant pressure distribution along the fiber, or—if different pressures are set—in a pressure gradient. The ends of a gas cell contain either a suitable window (see FIG. 1) to transmit the input/output pulses or a pressure-tight fitting to connect an additional cell.

The fluid module 114 includes a section of the adjustment device 30 comprising an electronic pressure regulator with a range from low vacuum to several 10 bar. The module 114 furthermore may comprise interfaces to connect via high pressure and vacuum lines 116 to a gas supply device 40, including gas reservoirs and a vacuum pump (not shown).

Relevant parameters of the synthesized broadband light pulses 1, like e.g. average power, beam pointing stability, spectrum, beam quality or noise, are monitored with a monitoring device 50 included in the post-processing module 115. Feedback is given to the pre-processing module 112 to optimize coupling into the hollow fiber 10 (output check) and to the fluid module 114. In particular, a part or all of the synthesized spectrum is monitored and instabilities in the signal can be compensated by the beam stabilization system of the pre-processing module 112. Such instabilities may be a consequence of mechanical misalignment due to stress or thermal effects. Additionally, the spectrum is flattened and provided to the end user through a window.

An important feature of the system is dynamic feedback technology, integrated into the post-processing module 115, which monitors part of the emitted spectrum and provides a feedback signal through a system control loop 60 including the control unit 120 to the beam stabilization, to optimize the UV synthesizing process.

The control unit 120 is divided into controls 121 to 123 for the pump source device 20, the beam stabilization (section of the adjustment device 30), the gas supply (further section of the adjustment device 30) and the general system. In connection with the monitoring and adjustment devices 30, 50, the control unit 120 provides a control loop 60 for automatic regulation of the device operation. The control unit 120 is mounted in a 19" rack housing and the cables are long enough so that the control unit can be placed up to several meters away from the optical head 110.

The pump source control 121 includes the electronics, optics and—optionally—chiller to control the operation of the pump source device 20. With the beam stabilization control 122, an included micro-controller sets the performance of the beam stabilization system in the pre-processing module 112 and optimizes coupling into the hollow fiber 10. The system control 123 contains several A/D converters and microcontrollers to monitor and set various system parameters. Additionally this control 123 allows the user to interact with the system (standby- and on/off-switches) and provides different interfaces to connect the optical head 110 to the control unit 120 as well as interfaces for external computer control (RS232 and/or USB).

In operation of the broadband light source device 100, the pump pulses 2 are generated by the pump source module 111. The pump pulse beam is then delivered in free space towards the pre-processing module 112. Here, commercially available electronic, optical and mechanical elements are used for input check and beam control. The free-space beam is coupled into the core of the hollow fiber 10 and excites the transverse, fundamental core mode. Because of the pump pulse parameters (e.g. some 100 s fs pulse duration), the regime of modulation instability is (MI) is accessed to spectrally broaden the pulse [8]. The spectrally broadened output beam is collected by optical elements, shaped by the post-processing module 115 using commercially available electronic, optical and mechanical elements and provided to the end user as a free-space, collimated beam of broadband light pulses 1.

Figure 5:
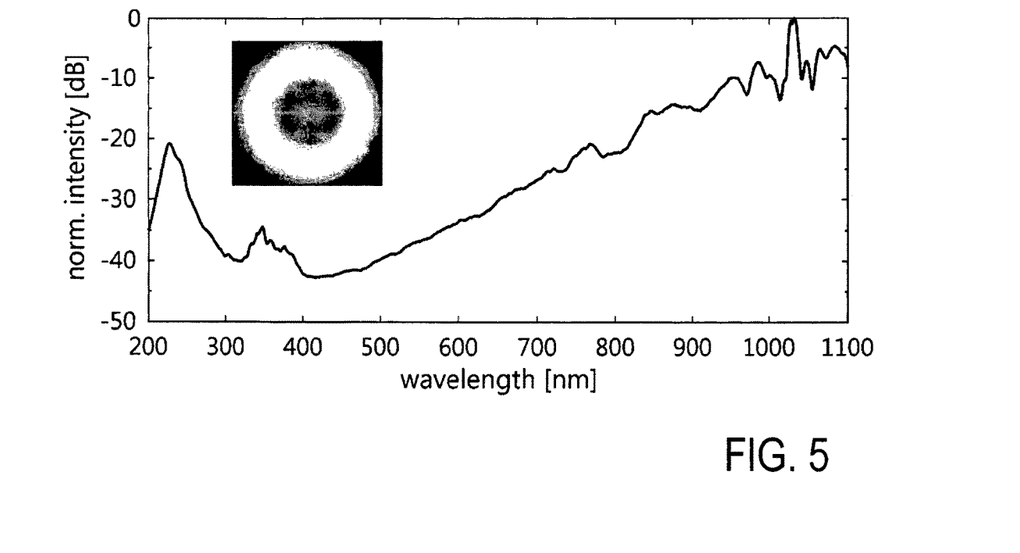
FIG. 5: an output spectrum of broadband light pulses created with the inventive method.

With a practical example, operation specifications are as follows. The broadband core mode spectrum covers a wavelength range from equal to or below 250 nm to equal to or above 1100 nm. The average output power of the broadband light pulses 1 is above 1 W, and the spectral flatness is below 15 dB (between 300 to 1000 nm). FIG. 5 illustrates an example of an emitted spectrum (calibrated) of the output broadband light pulses 1, ranging from the deep-UV to near-IR. The inset shows a beam cross section at 1.03 µm.

The features of the invention disclosed in the above description, the drawings and the claims can be of significance individually, in combination or sub-combination for the implementation of the invention in its different embodiments.

The invention claimed is:
1. A broadband light source device configured for creating broadband light pulses, comprising:
  a hollow-core fiber of non-bandgap type including a filling gas and being arranged to create the broadband light pulses by an optical non-linear broadening of pump laser pulses, wherein the hollow-core fiber has an axial hollow light guiding fiber core that supports core modes of a guided light field and an inner fiber structure that surrounds the fiber core and that supports transverse wall modes of the guided light field, and
  a pump laser source device being arranged to create and provide the pump laser pulses at an input side of the hollow-core fiber, wherein transverse wall modes include a fundamental transverse wall mode and second and higher order transverse wall modes, and wherein the broadband light pulses have a core mode spectrum being determined by a fiber length, a fiber core diameter, at least one pump pulse and/or beam parameter of the pump laser pulses and at least one gas parameter of the filling gas, wherein the inner fiber structure of the hollow-core fiber is configured such that at least the second and higher order transverse wall modes and the core mode spectrum have a spectral displacement relative to each other.

2. The broadband light source device of claim 1, wherein the inner fiber structure of the hollow-core fiber is configured such that all transverse wall modes and the core mode spectrum have a spectral displacement relative to each other.

3. The broadband light source device of claim 1, wherein fiber walls of the inner fiber structure facing to the fiber core have a wall thickness being selected such that at least the second and higher order transverse wall modes are spectrally shifted to shorter wavelengths relative to the core mode spectrum.

4. The broadband light source device of claim 3, wherein the fiber walls of the inner fiber structure have the selected limit wall thickness exclusively in a longitudinal section of the hollow-core fiber where the UV light pulses are created and transmitted through the hollow-core fiber.

5. The broadband light source device of claim 3, wherein:
the inner fiber structure comprises a single ring or a Kagomé structure, and
the fiber walls facing to the fiber core have a wall thickness (t) being selected such that $$t < \frac{\lambda_{min}}{2\sqrt{n_2^2 - n_1^2}}$$

wherein $\lambda_{min}$ a shortest wavelength of the core mode spectrum, $n_1$ is a refractive index of the filling gas in the hollow-core fiber and $n_2$ is a refractive index of the inner fiber structure.

6. The broadband light source device of claim 5, wherein:
the wall thickness is in a range from 70 nm to 300 nm or from 70 nm to 150 nm, and/or
the shortest wavelength $\lambda_{min}$ of the core mode spectrum is in a range from 170 nm to 250 nm.

7. The broadband light source device of claim 1, further comprising:
an adjustment device being arranged to adjust at least one of at least one pump pulse parameter, such as pulse duration, pulse energy, pulse shape and/or pulse spectrum, and at least one beam parameter, in particular modal shape, pointing and/or stability.

8. The broadband light source device of claim 7, further comprising:
a gas supply device being connected with the hollow-core fiber and being arranged to supply the filling gas to the hollow-core fiber,
wherein the adjustment device is connected with the gas supply device for adjusting the at least one gas parameter of the filling gas.

9. The broadband light source device of claim 1, further comprising:
a monitoring device being arranged to monitor at least a part of the core mode spectrum of the UV light pulses output from the hollow core fiber.

10. The broadband light source device of claim 9, further comprising:

a control loop including the monitoring device and the adjustment device,
wherein the control loop is adapted to control the adjustment device such that the spectral displacement of the transverse wall modes and the core mode spectrum is kept during operation of the UV light source device.

11. A method of creating broadband light pulses, comprising:
coupling pump laser pulses into a hollow-core fiber of non-bandgap type including a filling gas, wherein the hollow-core fiber has an axial hollow light guiding fiber core that supports core modes of a guided light field and an inner fiber structure that surrounds the fiber core and that supports transverse wall modes of the guided light field, wherein the transverse wall modes include a fundamental transverse wall mode and second and higher order transverse wall modes;
creating the broadband light pulses by an optical nonlinear broadening of the pump laser pulses in the hollow-core fiber, the broadband light pulses having a core mode spectrum being determined by a fiber length, a fiber core diameter, at least one pump pulse and/or beam parameter of the pump laser pulses and at least one gas parameter of the filling gas; and
spectrally displacing at least the second and higher order transverse wall modes and the core mode spectrum relative to each other.

12. The method of claim 11, wherein all transverse wall modes and the core mode spectrum are spectrally displaced relative to each other.

13. The method of claim 11, wherein the fiber walls of the inner fiber structure facing to the fiber core have a wall thickness selected such that at least the second and higher order transverse wall modes are spectrally shifted to shorter wavelengths relative to the core mode spectrum.

14. The method of claim 13, wherein the fiber walls of the inner fiber structure have the selected limit wall thickness exclusively in a longitudinal section of the hollow-core fiber where the broadband light pulses are created and transmitted through the hollow-core fiber.

15. The method of claim 11, wherein the inner fiber structure comprises a single ring or a Kagomé structure, and the fiber walls facing to the fiber core have a wall thickness being selected such that $$t < \frac{\lambda_{min}}{2\sqrt{n_2^2 - n_1^2}}$$

wherein $\lambda_{min}$ is the shortest wavelength of the core mode spectrum, $n_1$ is a refractive index of the filling gas in the hollow-core fiber and $n_2$ is a refractive index of the inner fiber structure.

16. The method of claim 15, wherein:
the wall thickness is in a range from 70 nm to 300 nm or from 70 nm to 150 nm, and/or
the shortest wavelength $\lambda_{min}$ of the core mode spectrum is in a range from 170 nm to 250 nm.

17. The method of claim 11, further comprising:
adjusting at least one of the at least one pump pulse and/or beam parameter.

18. The method of claim 17, further comprising:
filling gas to the hollow-core fiber, and
adjusting at least one of the at least one gas parameter of the filling gas.

19. The method of claim 11, further comprising:

monitoring at least a part of the core mode spectrum of the broadband light pulses output from the hollow core fiber.

20. The method of claim 19, further comprising:

controlling the adjusting with a control loop, such that the spectral displacement of the transverse wall modes and the core mode spectrum is kept during creating the broadband light pulses.

21. A hollow-core anti-resonant-reflecting fiber arranged for creating broadband light pulses by an optical non-linear broadening of pump laser pulses in a filling gas, comprising:

an axial hollow fiber core filled with the filling gas and configured to support core modes of a guided light field of the broadband light pulses; and an inner fiber structure surrounding the fiber core and configured to support transverse wall modes of the guided light field, wherein the transverse wall modes include a fundamental transverse wall mode and second and higher order transverse wall modes, wherein the broadband light pulses have a core mode spectrum being determined by a fiber length, a fiber core diameter, at least one pump pulse parameter of the pump laser pulses and at least one gas parameter of the filling gas, and the inner fiber structure of the hollow-core fiber is configured such that at least the second and higher order transverse wall modes and the core mode spectrum have a spectral displacement relative to each other.

\* \* \* \* \*

UNITED STATES PATENT AND TRADEMARK OFFICE
CERTIFICATE OF CORRECTION

PATENT NO. : 10,693,271 B2  
APPLICATION NO. : 16/471035  
DATED : June 23, 2020  
INVENTOR(S) : Uebel et al.

It is certified that error appears in the above-identified patent and that said Letters Patent is hereby corrected as shown below:

On the Title Page

Item (71), after "Max-Planck-Gesellschaft zur Fiirderung der Wissenschaften" please replace "E.V." with --e.V--.

Signed and Sealed this  
Sixth Day of October, 2020

Andrei Iancu  
*Director of the United States Patent and Trademark Office*